United States Patent [19]

Yamada et al.

[11] 4,008,858
[45] Feb. 22, 1977

[54] TREATING DEVICE FOR SYNTHETIC RESIN WASTE

[75] Inventors: Masatora Yamada, Iwata; Shigeo Tasaka, Tokyo; Tadayuki Okawa; Taichi Suzuki, both of Ibaragi, all of Japan

[73] Assignee: Mitsubishi Petrochemical Company Limited, Japan

[22] Filed: July 22, 1975

[21] Appl. No.: 598,121

Related U.S. Application Data

[63] Continuation-in-part of Ser. No. 358,923, May 10, 1973, abandoned.

[30] Foreign Application Priority Data

May 12, 1972 Japan .................. 47-55244[U]
June 29, 1972 Japan .................. 47-64457
Nov. 4, 1972 Japan .................. 47-110507

[52] U.S. Cl. .............. 241/101.2; 241/67; 241/247; 241/261.1
[51] Int. Cl.² ........................ B02C 7/175
[58] Field of Search ........... 241/101.2, 101.5, 67, 241/247, 261.1

[56] References Cited

UNITED STATES PATENTS

| | | | |
|---|---|---|---|
| 1,062,170 | 5/1913 | Layhoff | 241/67 |
| 1,141,898 | 6/1915 | Merritt | 241/67 |
| 3,008,505 | 11/1961 | Pavia | 241/247 |
| 3,658,266 | 4/1972 | O'Keefe | 241/101.2 |
| 3,788,567 | 1/1974 | Yamada | 241/247 |

*Primary Examiner*—Granville Y. Custer, Jr.
*Assistant Examiner*—Howard K. Goldberg
*Attorney, Agent, or Firm*—Robert E. Burns; Emmanuel J. Lobato; Bruce L. Adams

[57] ABSTRACT

An apparatus for treating synthetic resin waste containing thermoplastic synthetic resin and various foreign matter which often contain volatile matter. This apparatus makes it possible to produce articles, from the resin waste, having good mechanical properties by first driving off volatile matter. The apparatus is especially usable for producing long, bar-shaped products, large-sized cylindrical products, piles, sleepers, or molding flasks for concrete works.

3 Claims, 24 Drawing Figures

TREATING DEVICE FOR SYNTHETIC RESIN WASTE

This is a Continuation-in-part of our application Ser. No. 358,923 filed May 10, 1973, now abandoned.

BACKGROUND OF THE INVENTION

Generally, in a vent-type extruder, deairation is effected by reducing the pressure applied on the resin when the material resin is subjected to a melting process. In this case, it is usual to provide a deairing port between the compression zone and melting zone of the extruder.

However, in a device for treating synthetic resin waste of the type utilizing internal heat due to a thermal action produced in crushing of the synthetic resin waste or shearing of the particles of synthetic resin, it is impossible to execute lowering of the pressure or deairation in the melting process of the synthetic resin waste.

With a device for treating synthetic resin waste in which the thermoplastic resin is melted utilizing friction heat as described before, it is impossible to melt the thermoplastic synthetic resin itself in the waste if the pressure and the temperature are lowered in the course of melting. That is why volatile matter could not be driven off from the above device which cannot carry out extrusion under a high temperature and a high pressure.

In the present invention, an apparatus for treating synthetic resin waste is made by combining a "deairing and back-pressure increasing mechanism" and a device of the type utilizing friction heat as stated before and also as described in U.S. Pat. No. 3,783,567. By using the apparatus it is possible to drive off volatile matter from the melt of synthetic resin waste containing thermoplastic synthetic resin and also to carry out extrusion under a high pressure. Consequently it is possible to obtain a product which has an excellent mechanical strength and good quality and having no voids internally.

The present invention relates to an apparatus for treating synthetic resin waste utilizing friction heat produced by crushing of the synthetic resin waste or shearing of the particles of the synthetic resin, etc.

In general, various substances are contained in synthetic resin waste material. They are, for example, sand, gravel, paper, etc. This foreign matter often contains water, or other volatile matter.

Therefore, when the synthetic resin waste containing the various foreign matter are melted and extruded, the volatile matter in the foreign matter forms vacant spaces in the product and products molded with the melt as the molding material form internally with faults due to air bubbles, etc.

Accordingly, in the present invention, the apparatus is supplemented by a "deairing and back-pressure increasing mechanism" provided on the body of a melting and extruding device to drive off the volatile matter contained in the melt. The products made of such a melted material assure excellent quality without internal faults.

SUMMARY OF THE INVENTION

An object of the present invention is to provide an apparatus for treating synthetic resin waste containing thermoplastic synthetic resin and foreing matter such as metal, sand, gravel, glass, etc.

Another object of the present invention is to provide an apparatus for treating synthetic resin waste wherein the synthetic resin waste is melted by utilizing frictional heat produced by thermal action by the crushing or the shearing of the waste.

A further object of the present invention is to provide an apparatus for treating synthetic resin waste of various kinds, various forms and various sizes, containing the foreign matter; the synthetic resin waste is previously broken or crushed into pieces or strips or granular form, and using them as the raw material, they are treated for bonding.

Still another object of the present invention is to provide an apparatus for driving off volatile matter contained in the melts after the thermoplastic synthetic resin has been melted.

Another object of the present invention is to provide an apparatus for treating synthetic resin waste provided with a melting and extruding body for melting the synthetic resin waste, and a "deairing and back-pressure increasing mechanism" added to the melting and extruding body.

DETAILED DESCRIPTION OF THE INVENTION

The invention will now be described referring to the drawings.

Figure 1A:
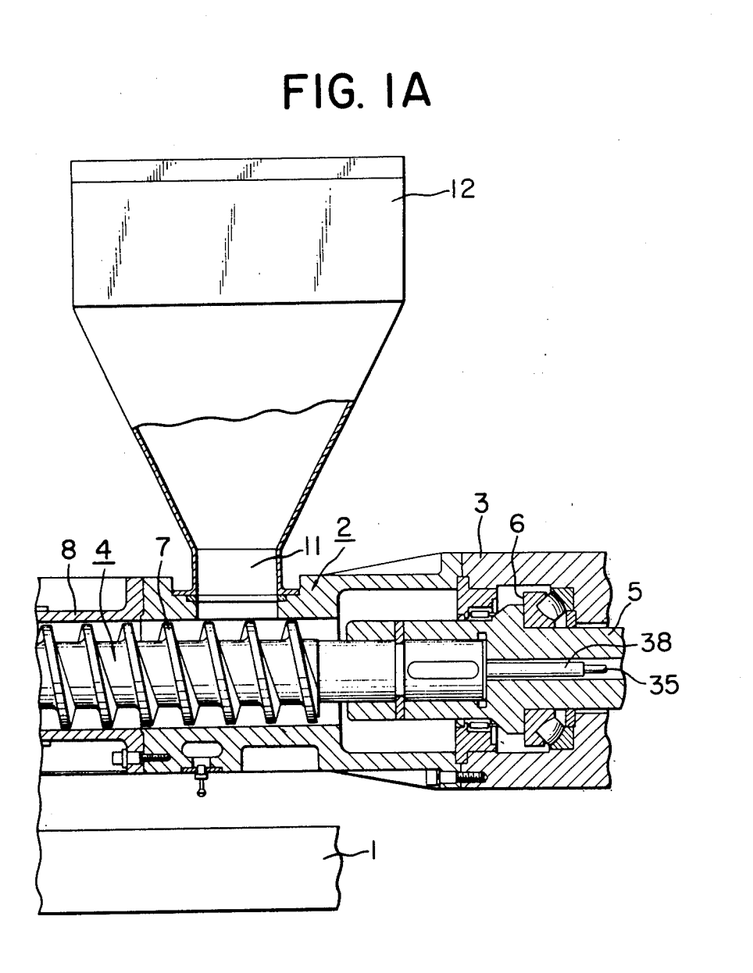
FIG. 1A is a fragmentary sectional right-half front elevation view showing an essential part of an apparatus for treating synthetic resin waste according to the present invention.
Figure 1B:
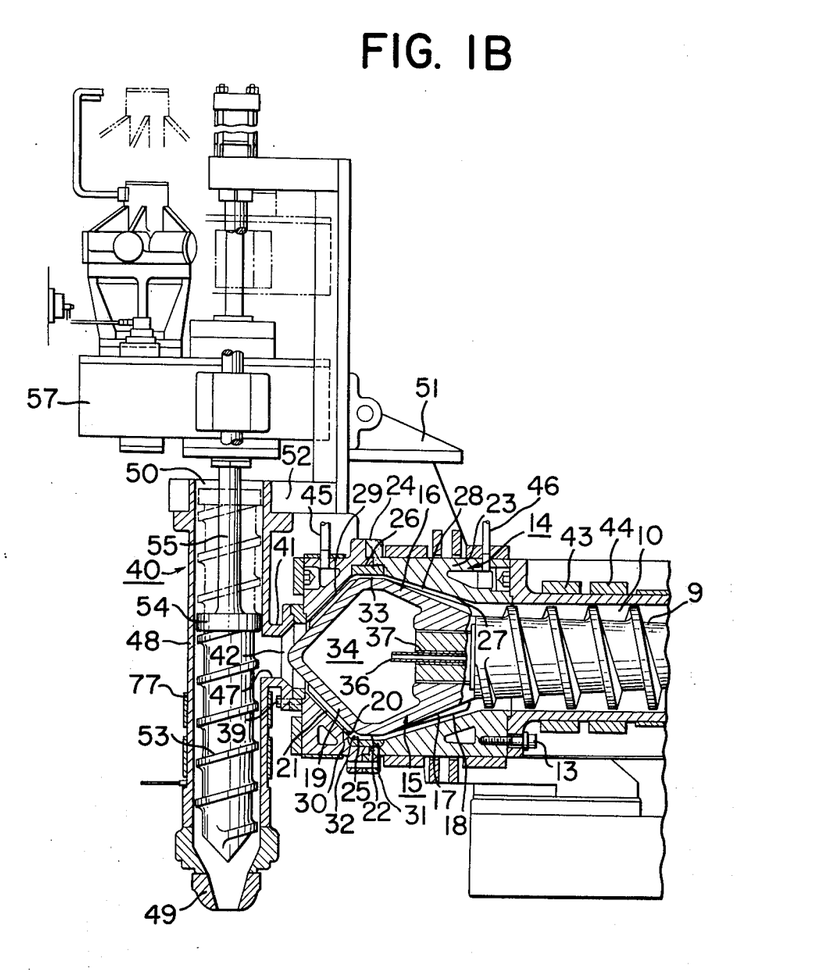
FIG. 1B is a similar view to FIG. 1A showing the left-half portion.

As shown in FIGS. 1A and 1B, a melt extruding body 2 is provided and supported by a base 1. At an end portion 3 of the body 2, a base cylinder 5 holding integrally and rotatably the right end of a rotating shaft 4 is supported by means of a bearing 6, and the rotating shaft 4 is rotatably driven by means of an appropriate driving means (not shown). A feeding screw portion 7 forming a material feeding portion is provided on the rotating shaft 4. The screw portion 7 is surrounded by a cylinder 8, and a small gap is formed between the outer periphery of said screw portion 7 and the inner peripheral wall of the cylinder 8, the gap is sufficient for allowing the rotation of the screw portion 7. A rod portion 9, around which the screw portion 7 is developed increases in diameter from right to left, so that the space 10 formed between the screw portion 7 and the inner peripheral wall of the cylinder 8 is formed with a material charging port 11, and a hopper 12 is connected on said charging port 11.

The end portion of the cylinder 8 is secured to an outer wall 14 of a grinding chamber by bolts 13. That is, the cyliner 8 cylinder combined integrally with the outer wall 14. A rotating body 15 having a shape of an abacus bead is formed at the top end of the rotating shaft 4 which extends into the outer wall 14 of the grinding chamber as described in U.S. Pat. No. 3,788,567.

Figure 2:
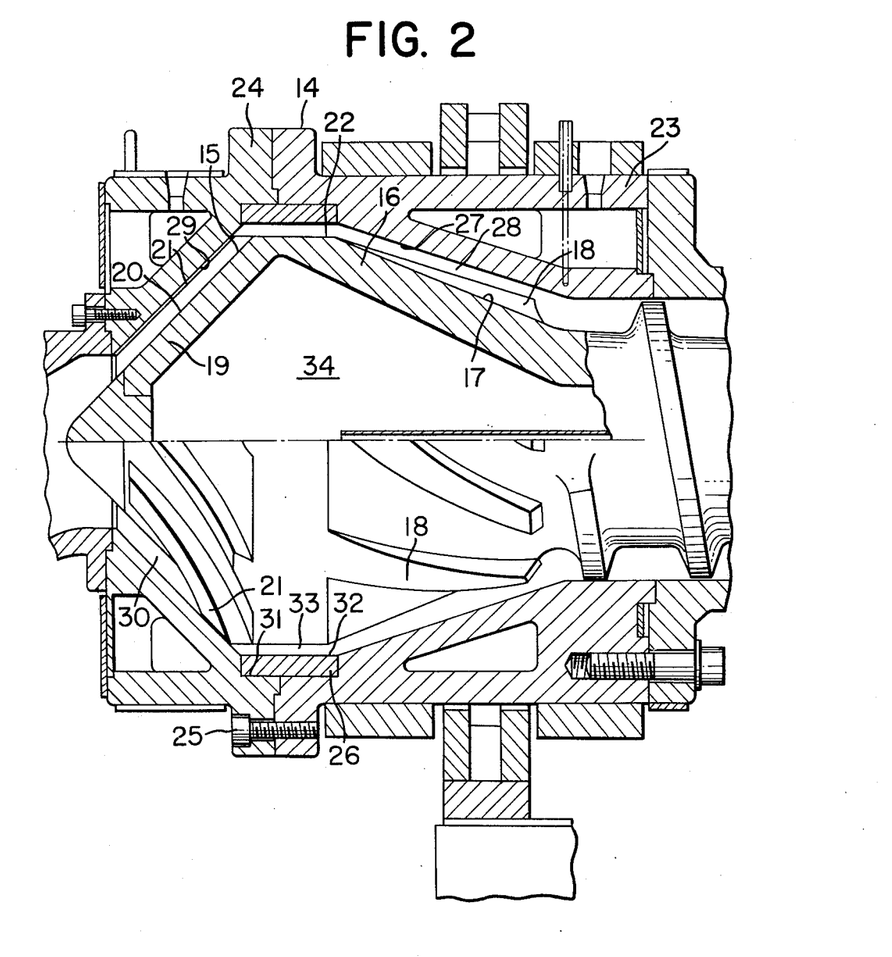
FIG. 2 is a fragmentary sectional view showing on an enlarged scale the melt extruding body shown in FIG. 1A and FIG. 1B, FIGS. 3 through 5 are sectional views showing various sectional forms of regulating tubular pieces.

As shown in FIG. 2, the outer peripheral surface 17 of the right half 16 of the rotating body 15 is tapered upwardly from right to left with respect to the axis of the rotating shaft 4. On the outer peripheral surface 17, there are formed curved guide ridges 18, 18, which extend upwardly beginning from the boundary with the screw portion 7 along a tapered outer periphery to the left, the width of the guide ridges 18, 18 increases as they approach the end portion.

As shown in FIG. 2, the outer peripheral surface 20 of the left half 19 of said rotating body 15 is formed as a taper descending with a sharp inclination from right to left with respect to the axis of the rotating shaft 4, and guide ridges 21, 21 are provied projecting on the outer peripheral surface 20. The outer periphery of the boundary portion between the right half portion 16 and the left half portion 19 is formed in a straight cylindrical peripheral surface 22 which parallels an axial line of the rotating body 15. The rotating shaft 4 is combined integrally with the rotary body 15.

The outer wall 14 of the grinding chamber is formed by fixing the right half portion 23 and the left half portion 24 with a bolt 25. A regulating tubular piece 26 is inserted inside the outer wall 14 of the grinding chamber facing the straight cylindrical peripheral surface 22 of said rotating body 15.

A tapered gap 28 formed between the inner peripheral wall 27 of the right half portion 23 of the grinding chamber and the outer peripheral surface 17 of the right half portion 16 of the rotating body 15 diminishes from right to left. The radial gap at the smaller diameter portion of the rotating body 15 following the left end of said screw portion 7 is larger than the gap at the diameter portion of the rotating body 15. The guide ridges 18, 18 extend from the end of the smaller diameter portion of the rotating body 15 to the boundary region of the straight cylindrical peripheral surface 22, and the height from the outer peripheral surface 17 at the end of the smaller diameter portion reduces gradually, and it is so formed that they meet with the outer peripheral surface 17 at the boundary region of the cylindrical peripheral surface 22.

An annular passage gap 30 inclining rather sharply is formed between the inner peripheral wall 29 of the left half portion 24 of the outer wall 14 of the grinding chamber and the outer peripheral surface 20 of the left half portion 19 of the rotating body 15. The guide ridges 21, 21, extend from the boundary region of the cylindrical peripheral surface 22 to the vicinity of the top end portion of the rotating body 15, and the distance between the outermost periphery and the inner peripheral wall 29 is extremely small.

The regulating piece 26 inserted at the boundary portion between the right half portion 23 and the left half portion 24 of said outer wall 14 presents an annular shape, and is fitted in the notch portion 31. The gap formed between the inner peripheral surface 32 of the regulating piece 26 and the cylindrical peripheral surface 22 formed at the boundary portion of the right half portion 16 and the left half portion 19 of the rotating body 15 presents a cylindrical annular gap 33. At space 34 is a cooling medium chamber provided in the rotating body, and the cooling medium is introduced from the liquid feeding port 36 through a liquid feeding pipe 35, and is delivered from a liquid discharging pipe 38 through a liquid discharging port 37.

The regulating piece 26 serves to form a cylindrical annular gap 33 between the regulating piece 26 and the cylindrical peripheral surface 22 of the rotating body 15, but this regulating piece is made replaceable to adapt the gap according to the material to be treated, by preparing gaps having various cross-sections by using different regulating pieces.

Figure 3:
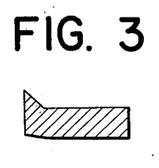
Figure 4:
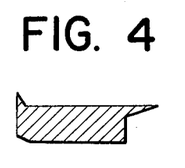
Figure 5:
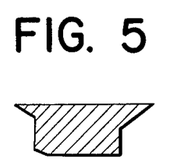
Figure 6:
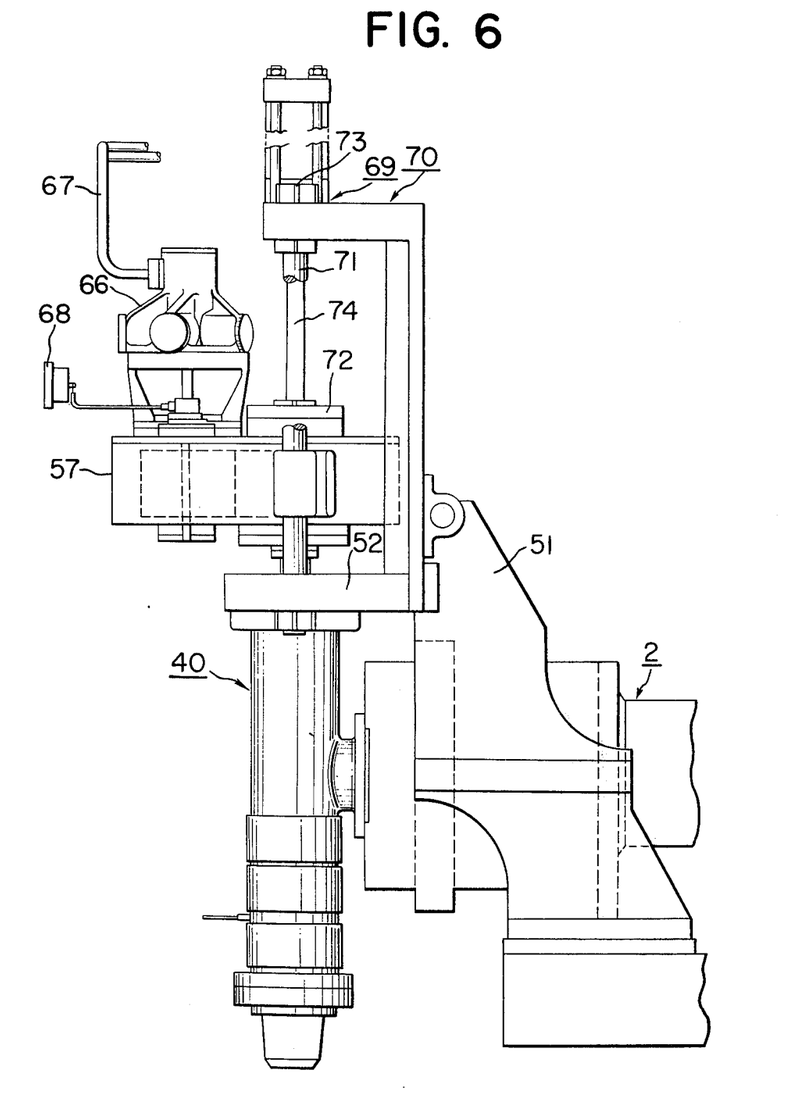
FIG. 6 is a front elevation view of a "deairing and back-pressure increasing mechanism" added to said melt extruding body.

For example, in a case where the length of the cylindrical peripheral surface is 45 mm, and when treating thermoplastic resin which is relatively hard to decomopose such as polyethylene, polypropylene, the cylindrical annular gap 33 is about 4–10 mm; in treating relatively soft vinyl chloride resin, the gap is 6–10 mm; for hard vinyl chloride which is easily decomposed, 10–15 mm. That is, a larger cylindrical annular gap 33 is selected for treating resin which is easily decomposable thereby to lessen the internal heat generation as much as possible, thus it is possible to prevent the decomposition of the resin. FIGS. 3, 4, 5 show cross sections of various regulating pieces, which are conveniently replaced and set at the notch portion 31 of the outer wall 14 of the grinding chamber so as to adjust the radial width of the annular gap 33.

A discharging portion 41 of a "deairing and back-pressure increasing mechanism" 40 is mounted on the left half portion 24 of the outer wall 14, and it is so formed that the melted synthetic resin waste is introduced from the melt extruding body 2 into the departing and back-pressure increasing mechanism 40 through transfer port 42. The numerals 43, 44 designate heaters provided around the cylinder 8, 45, 46 show feed pipes for cooling water.

The deairing and back-pressure increasing mechanism 40 is shown in FIG. 1 and FIGS. 6–9. The discharging portion 41 communicates with the transfer port 42 of the melt extruding body 2 through a charging port 47 of a cylindrical portion or cylinder 48 extending in a vertical direction. At the lower end of the cylinder 48 there is fixed an outlet 49, with a reducing or tapered diameter converging to the cylindrical annular gap 33, the upper end 50 of the cylindrical portion 48 is open to the atmosphere, and is suspended by a supporting plate 52 of a supporting portion 51.

A screw 53 for increasing back pressure is fitted in the vertical cylindrical portion 48. A circumferential flange portion 54 in a form of a piston is provided at the upper end of the screw 53, a supporting shaft 56 fomred at the upper part of a rod 55 extending upwardly through the flange portion 54 is mounted rotatably on a bearing 59 provided in a supporting plate 58 of a "raising and lowering body" 57. A gear wheel 60 fixed on the upper end of the rod 55 is in engagement with a gear wheel 62 of a screw driving mechanism 61. A gap 63 for allowing escape of gas is formed between the external peripheral surface of the piston-defining flange portion 54 and the internal peripheral surface of the cylindrical portion 48. Melted resin is unable to leak out through the gap 63 (see FIG. 9).

The screw driving mechanism 61 is mounted on the raising and lowering body 57, and the upper portion of a shaft 65, on which is secured the gear wheel 62 in a gear box 64 provided at the raising and lowering body 57, is connected to a shaft of a hydraulic motor 66. By operating the hydraulic motor 66 to rotate the gear wheel 62 through the shaft 65, the screw 53 can be rotated integral with the rod 55 through the gear wheel 60 engaging with the gear wheel 62.

In this case, the rod 55 is connected to the supporting shaft 56 through the bearing 59 of the supporting plate 58. In the drawing, the numeral 67 designates an oil pressure pipe line to a hydraulic motor 66; 68 designates a tachometer indicating the number of revolutions of the shaft 65.

Figure 7:
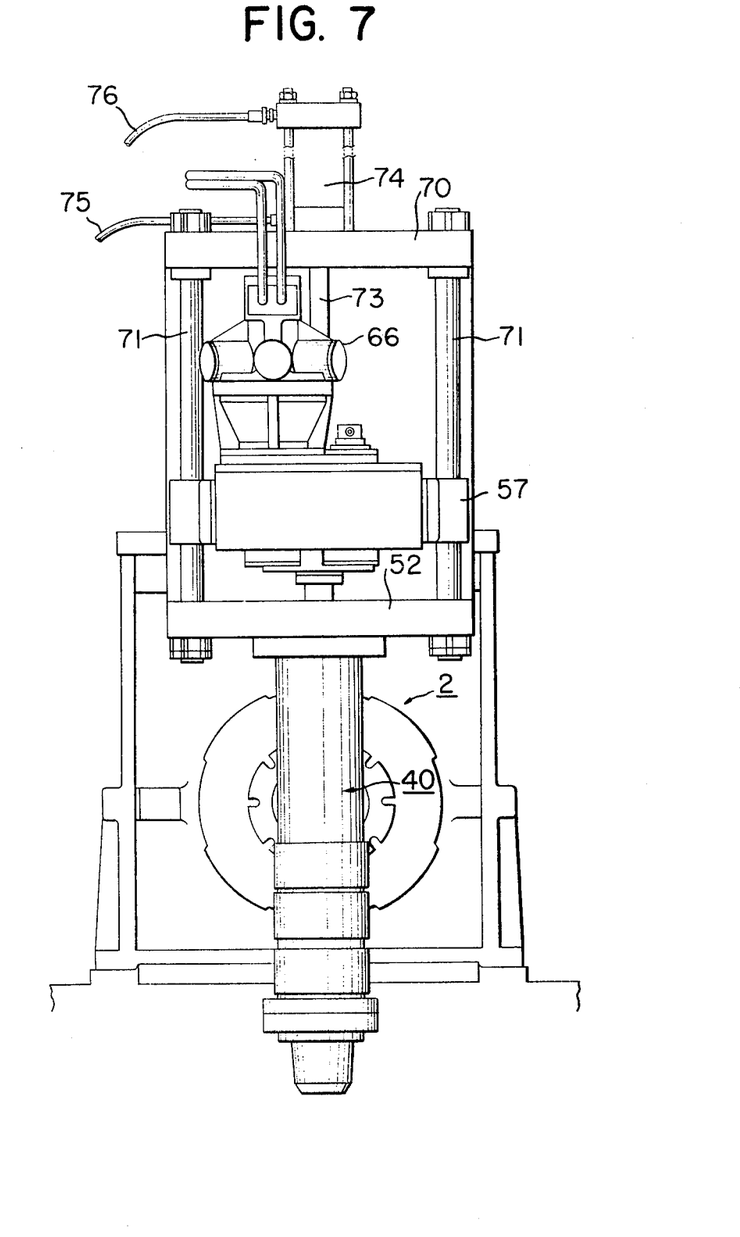
FIG. 7 is A side elevation view as seen from the left side of the deairing and back-pressure increasing mchanism shown in FIG. 6.
Figure 8:
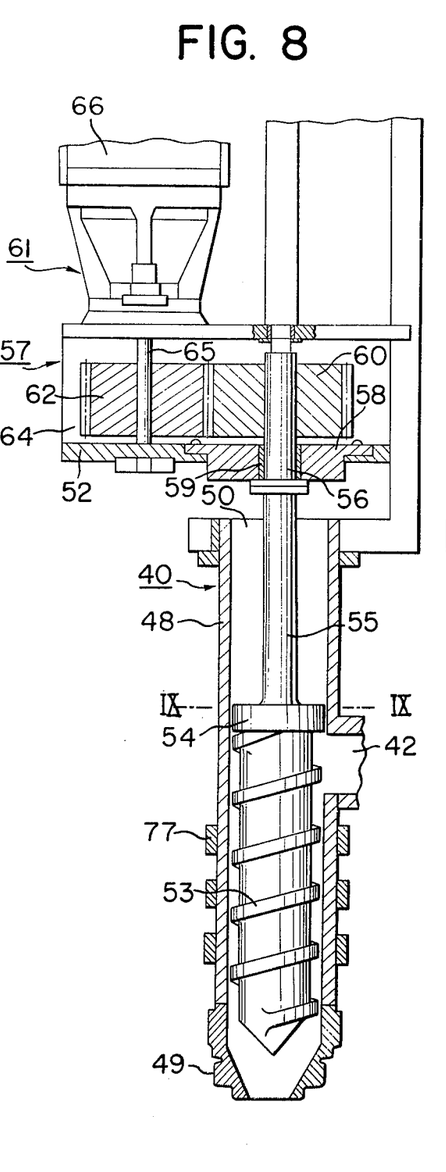
FIG. 8 is an enlarged sectional view showing essential parts of said deairing and back-pressure increasing mechanism.
Figure 9:
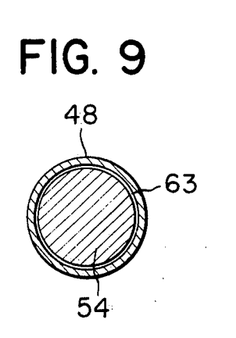
FIG. 9 is a sectional view along the section line IX—IX in FIG. 8.

Next, both ends of the raising and lowering body 57 are fitted into supporting columns 71, 71 whose upper and lower ends are fixed on a lower supporting plate 52 and an upper supporting piece 70 of the supporting portion 51 as shown in FIG. 7. The upper end of a piston rod 73 whose lower end is fixed on an attaching portion 72 fixed on the raising and lowering body 57 is fitted in a hydraulic cylinder 74 for drawing the raising and lowering body 57 mounted on the upper supporting piece 70. It is so arranged that by supplying an oil pressure from the raising pipe line 75, the raising and lowering body 57 is raised along the supporting columns 71, 71 through the piston rod 73, or by supplying an oil pressure from the lowering pipe line 76. In the drawing, the numeral 77 designates a heater provided on the outer periphery of the cylindrical portion 48.

The regulating piece 26 forms the cylindrical annular gap 33 between its surface and the cylindrical peripheral surface 22 of the rotating body 15. In order that the annular gap is appropriate for a material to be treated, a number of regulating pieces 26, having various cross sectional shapes are provided so as to replace them freely.

In this way, the gap 28 continuous to the material feeding zone forms a material grinding zone, the annular gap 33 continuous with the gap 28 forms a temporarily staying zone, and the gap 30 continuous with the gap 33 forms a zone where the preplasticized material is melted in a short time.

In the material feeding zone, the material containing synthetic resin waste passes through the space 10 formed between the cylinder 8 and the screw portion 7, and is compressed and broken while being transferred from right to left.

During this time, since the space 10, is made to reduce gradually from right to left, the breakage and compression of the material is promoted. The material is preheated by heaters 43, 44, but in this zone the thermoplastic synthetic resin in the material are kept from being melted, mixed and kneaded.

In the material grinding zone, the gap 28 in the radial direction is not kept so large. In this zone, the raw material fed between the outer wall 14, which is in a fixed state, and the rotating body 15, which is being rotated, are ground by the rotation of the rotating body 15. At this time, by the frictional heat produced by the thermal action by the shearing of the waste, the surface of the thermoplastic synthetic resin is melted.

In this case, since the peripheral velocity of the rotating body 15 is larger at the larger diameter portion than the smaller diameter portion, the grinding and shearing actions of the synthetic resin waste in the raw material are promoted all the more, and the curved guide ridges 18, 18 urge the transfer of the material in this grinding zone.

The degree of feeding material from the material feeding zone to the material grinding zone is such that the material is being transferred under pressure. The material grinding zone is relatively short in the axial direction, and the slope is not so gentle, so that the synthetic resin waste can be subjected to the grinding or shearing action, producing internal heat which produces a certain degree of adhesive force, causing foreign matter to adhere which are not of synthetic resin in the material. In other words, in general, the thermoplastic synthetic resin material is melted completely for forming articles, but in the material grinding zone according to the present invention, it is not required to melt it so completely. More particularly, the rotating speed, shape, size, and the capacity of the material grinding zone, axial distance, inclination of the rotating body are so determined by the species of raw material.

According to the present invention the driving mechanism is operated by an electric motor (not shown), and the rotating shaft 4 is driven by the driving mechanism, and at the same time the rotating body 15 is rotated thereby.

The synthetic resin waste material containing mud, stone, wood piece, paper, metal piece adhered or mixed therewith, are charged into the material feeding zone.

With the rotation of the rotating shaft 4, the material is pressed and fed into the material grinding zone by means of the screw portion 7. In the material grinding zone, the material is subjected to a friction caused by the rotating body 15 which rotates in the outer wall 14 which is stationary, and the material is placed under a shaking condition. Under such a condition, the synthetic resin is ground rapidly or sheared, so that the material produces an internal heat within an extremely short time, in which the material advances from the small diameter portion to the large diameter portion of the rotating body 15. Accordingly, even when the material is thermally decomposable easily such as polyvinyl chloride resin, no time is provided for a thermal decomposition to soften and melt it within a hasty and short period of time.

In this case, the guide ridges 18, 18 protrudingly provided on the rotating body 15 accelerate the grinding and shearing actions of the synthetic resin.

In this manner, even if the material is of a decomposable type of resins, such as polyvinyl chloride resin or polystyrene resin, they can be treated without producing decomposed gases.

Successively, the ground material (in this material, foreign matter such as sand, paper, etc. are mixed) enter into an annular gap 33.

The material, stopped for a while at this annular gap 33 and ground and given with an adhesive property, is pushed forward by the successive ground material, and because of the increasing back pressure, the kneading effect of the resin is promoted.

The provision of such annular gap 33 is extremely effective for improving the kneading effect of the thermoplastic resin in this apparatus. If the apparatus is not provided with such an annular gap, the kneading is not carried out sufficiently due to shortage of back pressure applied on the resin, so that an appropriate treatment is unable to be expected.

Thus, a mixture consisting of the resin and the foreign matter is passed through the gap 33 is made to pass through the gap 30. This gap 30 presents a short distance axially and steeply tapered while decreasing its diameter radially, so that it is possible to melt, at a stretch, the provisionally plasticized mixture under a high pressure in the grinding zone and the annular gap 33.

Then the melted mixture is delivered from the gap 30 to the deairing and back-pressure increasing mechanism 40 through the transfer port 42.

At this time, the guide ridges 21, 21 provided at the left half portion 24 of the rotating body 15 serve to promote the delivering of said mixture. It is preferable to provide the guide ridges 21, 21 when the mixture contains easily decomposable resin such as polyvinyl, but when the material to be treated contains polyethylene, no guide ridges are needed.

The melted mixture delivered to the deairing and back-pressure increasing mechanism 40 through the transfer port 42 is temporarily stored in a space of the cylindrical portion 48 which is produced by the uplift of the screw 53 integrally rotating with the rod 55 through gear wheels 62, 60 driven by the hydraulic motor 66. At this stage, volatile matter such as steam in the melted mixture escapes into the atmosphere through the gap 63. The rotation of the screw 53 promotes the escape of said volatile matter, and at the same time improves the kneading effect of the melted mixture, causes a uniform heat distribution, and prevents a local temperature rise. The escapement of the volatile matter from the melted mixture increases the discharge pressure of the melt from the outlet 49. Next, by lowering the screw 53, the melt is extruded into a metal mold through the outlet 49.

In this case, the width of the gap 63 is conveniently taken in a range of 0.2 to 0.5 mm.

The number of revolutions of the screw 53 is measured by a tachmometer 68 and is adjusted by regulating the quantity of oil fed to the hydraulic motor 66.

The heater 77 serves to maintain the temperature of the melted mixture in the cylinder portion 48.

The piston-shaped flange portion 54 connected to the screw 53 in the deairing and back-pressure increasing mechanism 40 is positioned opposite of the outlet 49 of the cylinder portion 48 having the charging port 47.

The raising and lowering body 57 and the screw 53 are raised integrally by operating the hydraulic motor 63. By raising the piston rod 73, the raising and lowering body 57 is lifted along the supporting columns 71, 71, so that the screw 53 can be raised as shown by the broken line in FIG. 1.

When the screw is rotated and raised, the melted mixture in the cylinder portion 48 will not leak, by its own gravity, through the gap between the outermost periphery of the screw 53 and the inner periphery of the cylinder portion 48. So leakage out the outlet 49 is prevented. Such an effect is obtained by the adjustment of the kneading, a slight lowering of temperature, and an upward pushing force brought about by the lifting screw 53.

Accordingly, in the apparatus according to the present invention, it is possible to replace the forming metal molds connected to the outlet of the apparatus without using a valve for preventing leakage of melts at the top end of the outlet 40, and without interrupting the rotation of the rotating shaft 4 of the melt extruding body 2.

A forming is effected by rotating and vertically moving the screw 53 of the deairing and back-pressure increasing mechanism 40, but it is to be understood that the operation may also be effected without moving the screw 53 vertically.

The later operation is simple and convenient when small-sized articles are to be made.

Comparing now the performances between the apparatus (A) equipped with the "deairing and back-pressure increasing mechanism" 40 according to the present invention and the device (B) which is not equipped with said mechanism.

1. As to the point of constant output:

The fluctuation of extruding quantity in the apparatus (A) of present invention is ± 5%, while that in the device (B) is ± 25%.

2. As to the pouring time:

When an elongated article having a size of 110 mm × 110 mm × 2000 mm and a weight of 15 kg is to be formed, the pouring time required in the apparatus (A) was 120 seconds, while that required in the device (B) was 150 seconds. In another case where an elongated article 110 mm × 45 mm × 6000 mm in size and 25 kg in weight is to be formed, the apparatus (A) required 230 sec. while the device (B) required 300 sec.

Figure 10:
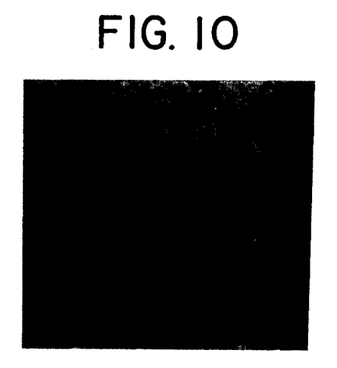
FIG. 10 is a fragmental photograph showing a general behavior of agglomerated and solidified melt of the synthetic resin waste extruded using the apparatus shown in FIG. 1.
Figure 11:
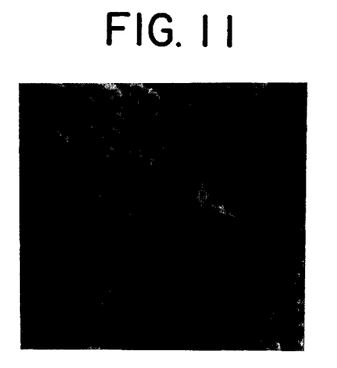
FIG. 11 is a fragmentary photograph showing a general behavior of agglomerated and solidified melt of the synthetic resin waste extruded, excluding the deairing and back-pressure increasing mechanism in the apparatus shown in FIG. 1.

3. As to the degree of kneading:

Degree of kneading in the apparatus (A) is far more superior to the device (B) (Refer to FIGS. 10 and 11).

4. As to the size of formed product:

A large-sized formed article can be produced in the apparatus (A) rather than in the device (B). Namely, in forming a sheet 20 mm thick and 600 mm wide, a length of 1500 mm was obtained in the apparatus (A), but only 500 mm length was obtained in the device (B). Also in producing a bottomed cylinder 10 mm thick and 300 mm diameter, the height obtained in the apparatus (A) was 400 mm, while in the device (B) it was 150 mm.

In the apparatus according to the present invention, the thermoplastic synthetic resin in the waste is melted to combine with the foreign matter by frictional heat. The heat is produced by the friction developed by the crushing or shearing of the synthetic resin waste. The internal heat generation is controlled by the characteristic property of the synthetic resin waste. The melted waste can be extruded after the volatile matter, such as water contained in the waste, has been driven off so that the internal structure of products thus formed with such melt is soldified, and no weak faulty portion such as bubbles is produced therein (refer to FIG. 10).

An appropriate metal mold for producing large-sized articles is illustrated in FIGS. 12 through 20.

The mold shown in FIGS. 12 through 16 can be applied for forming a pile having a screw portion at the tip end.

Figure 12:
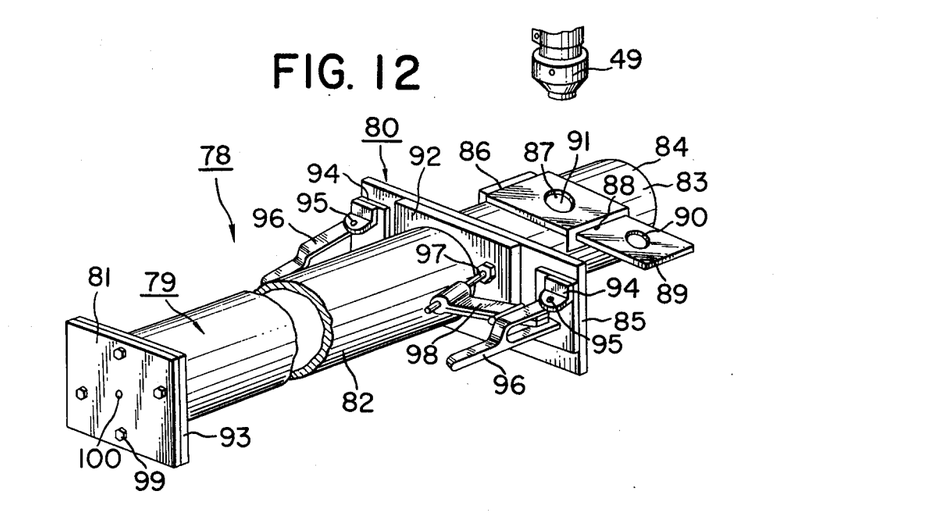
FIG. 12 is a perspective view of a metal mold appropriate to be used for producing articles using the melt, as the material, extruded from the appAratus for treating synthetic resin waste according to the present invention.

The metal mold 78 comprises a main body 79 having substantially a round appearance, a flange-shaped joining portion 80 provided in the longitudinal direction of the main body 79, and a cover plate 81 mounted at the end of the main body 79. The main body 79 is formed with a detachable main forming side portion 82 and an auxiliary forming side portion 83 with the intermediary of a joining portion. One end 84 of the auxiliary forming side portion 83 is formed as a closed end, the other end is formed as a bottomed cylinder fixed with a flange plate 85, and a shutter guide 86 is fixed at the upper surface. On the shutter guide, a pouring port 87 is formed which is connectable to the outlet 49 of the apparatus shown in FIG. 1B. A shutter plate 89 is slidable and inserted in a guide slot 88 formed in the shutter guide 86, and a port 90 is formed in the shutter plate 89 for communication with the pouring port 87 in said shutter guide 86.

On the upper surface of the auxiliary forming side portion 83, an inlet 91 is formed at a position corresponding to the pouring port 87.

The main forming side portion 82 presents a cylindrical form, and a flange plate 92 is fixed at one end, which can freely be joined with said flange plate 85, and another flange plate 92 is fixed at the other end, which can be joined with the cover plate 81. Clamps 96, 96 are provided swingably, through pins 95, 95 in supporting portions 94, 94 provided on the flange plate 85. Supporting members 98, 98 are provided with their base ends mounted on the shaft provided normal to the flange plate 92, whereby the main forming side portion 82 and the auxiliary forming side portion 83 can be joined tightly and detachably by tightening each of the clamps 96 and the supporting members 98 through the flange plates 85, 92.

A detachable cover plate 81 is fixed on the other end of the main forming side portion 82 by means of bolts 99, 99, and an air escape hole 100 is formed at the center thereof.

Figure 13:
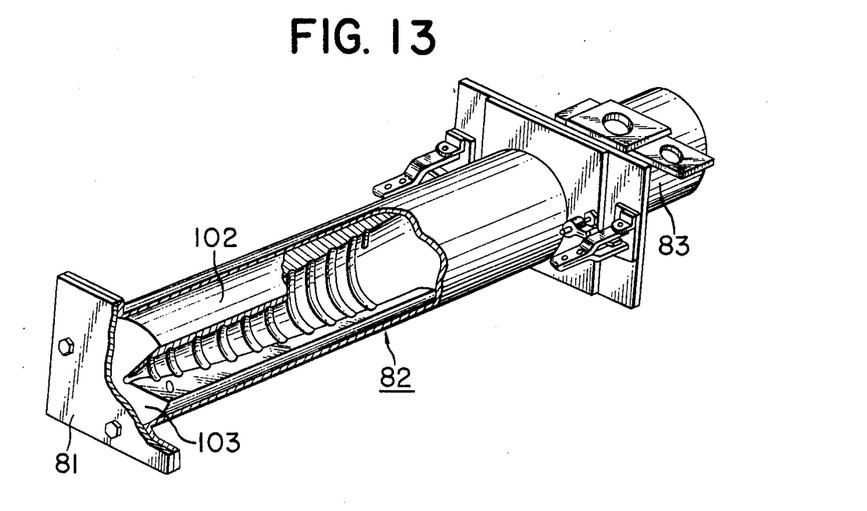
FIG. 13 is a perspective view, partly broken, of a metal mold in which an inner metal mold is enclosed in the metal mold shown in FIG. 12, for forming a screw pile.
Figure 14:
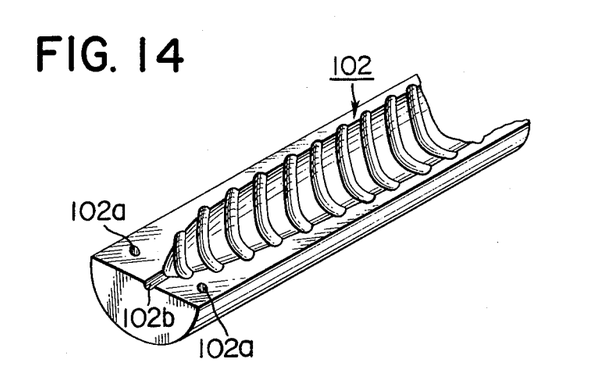
FIG. 14 is a perspective view showing one half of a divided mold of an inner metal mold shown in FIG. 13.
Figure 15:
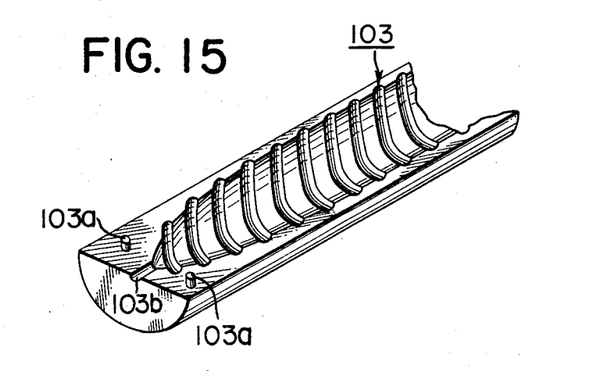
FIG. 15 is a perspective view showing another half of the divided mold of the inner metal mold shown in FIG. 13.

The metal mold shown in FIG. 13 further houses an inner metal mold 101 securely. This inner metal mold 101 is used for forming screw piles as shown in FIGS. 14 and 15, and constitutes two divided molds, one of the divided mold 102 and the other of the divided mold 103 form a coupled mold by means of corresponding inserting holes 102a, 102a and projecting portions 103a, 103a. The divided mold is provided with a screw forming portion, a round bar forming portion and a square bar forming portion, and is formed with grooves 102b, 103b for forming an air escape.

The main forming side portion 82 and the auxiliary forming side portion 83 are used after they have been united integrally by means of the supporting members 98, 98 and the clamps 96, 96.

Figure 16:
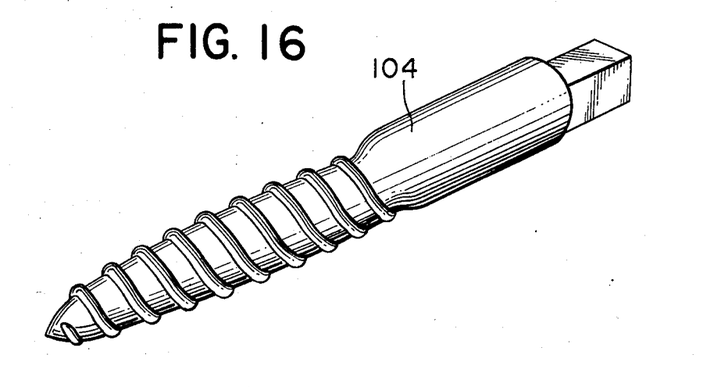
FIG. 16 is a perspective view of a screw pile formed by using the metal mold shown in FIGS. 12 through 15, with the melt extruded from the apparatus for treating synthetic resin water as the material.

A process of forming a pile having a thickness of about 80 mm, a length of 1500 mm and a shape as shown in FIG. 16 will now be described referring to FIG. 13.

Removing the cover plate 81 fixed on the main forming side portion 82, inserting a pair of divided molds 102, 103 through both the main forming side portion 82 and auxiliary forming side portion 83, mounting said cover plate 81, the auxiliary forming side portion 83 is joined securely to the main forming side portion 82 by means of clamps 96, 96 and the supporting members 98, 98.

Such a metal mold is placed horizontally with respect to its longitudinal direction, and the outlet 49 of the apparatus is inserted into the pouring port 87 of the auxiliary forming side portion 83 and is fixed.

Then the resin charging port 91 is opened by sliding the shutter plate 89, and after conforming said pouring port 87 and the resin charging port 91, the melted material which was delivered from the outlet 49 of the apparatus is introduced into the metal mold 78 having an inner metal mold 101 through said pouring port 87 and the resin charging port 91, and fills the cavity of the metal mold 78.

After the melted material fills the cavity of metal mold 78, the metal mold 78 is removed from the outlet 49 of the apparatus. The metal mold 78 thus removed is introduced into liquid in a tank which has been prepared separately for cooling the device rapidly, or simply let it stand for cooling.

After the metal mold 78 is cooled, releasing the clamps 96, 96 and the supporting members 98, 98 so as to separate the main forming side portion 82 from the auxiliary forming side portion 83, and drawing out the inner metal mold 101 containing a pair of divided molds 102, 103 and the formed article 104 included in the inner metal mold 101 integrally from the main forming side portion 82. Then separating the dividable molds 102, 103, the formed article is taken out therefrom. In this way the formed article 104 is produced.

Thereafter, the inner metal mold 101 is inserted and set in the metal mold 78 comprising the main forming side portion 82 and the auxiliary forming side portion 83, and again introducing the material in the cavity of metal mold 78 through the outlet 49 of the apparatus, and the succeeding production of the article is started again.

In the above description, a method of dividing the inner metal mold is used for removing the inner metal mold from the product, but it is also possible to remove the product by rotating without separating the inner metal mold. Furthermore, at the drawing of the product, it can be effected easily by drawing the product from one end of the mold owing to the shrinking property of the resin itself. But when the drawing is difficult, the product can easily be drawn by striking the inner metal mold with a hammer or the like at the side from which the cover plate 81 has first been removed. After the auxiliary forming side portion 83 has been removed from the main forming side portion 82, striking the formed article at this removing side with a hammer or the like, and when a portion of the inner metal mold 101 has been protuded beyond the main forming side portion 82, the formed article can be drawn out by gripping the inner metal mold 101.

In order to facilitate the introduction of resin into the cavity of the metal mold 78, it is preferable to form an air escape hole 100 in the cover plate 81 which is situated at the opposite end with regard to the resin charging port 87.

Figures 17, 18, 19, 20:
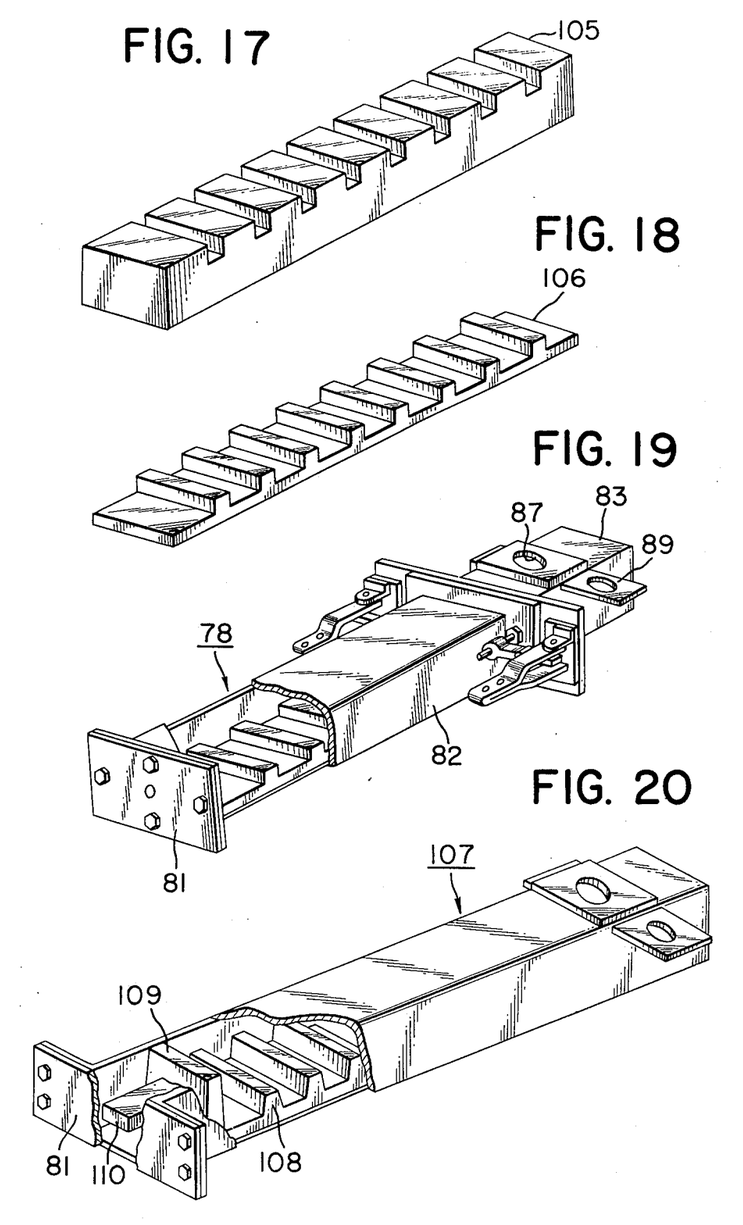
FIG. 17 is a perspective view showing a matrix for forming a concrete panel produced by the metal mold shown in FIG. 19.
FIG. 18 is a perspective view of an inner metal mold shown in FIG. 19.
FIG. 19 is a perspective view of an inner metal mold different from said inner metal mold housed or accommodated in the metal mold shown in FIG. 12, this is a case where the inner metal mold is used for producing an Article to be used as a matrix for forming a concrete panel.
FIG. 20 is a partly broken perspective view showing a modified example of the metal mold shown in FIG. 17.

When a concrete panel 105 having a large number of grooves on side surface as shown in FIG. 17, an inner metal mold 106 conforming with the panel to be produced as shown in FIG. 18 is first prepared.

Then, after the inner metal mold 106 is inserted in the metal mold 78, melted material is introduced in the cavity portion in the metal mold 78 through the pouring port 87 and the resin charging port 91, and after which the formed article 105 can be produced as described above.

As stated above, the metal mold consists of two hollow main and auxiliary forming side portions each having a simple cross section such as a circle, square, etc. The metal mold has a gap capable of accommodating removably inner metal mold. The inner metal mold is provided or formed with a whole or part of a design or pattern necessary for the molded products. The main forming side portion and the auxiliary side portion of the metal mold can be divided at a place which intersects at right angle or at a desired angle with respect to the longitudinal exis of the metal mold device.

However, the metal mold need not be consisted of the main forming side portion and the auxiliary forming side portion. The metal mold shown in FIG. 20 is provided with a preventing wall 109 for leakage of resin closely contacting with the whole periphery of the inner wall of the hollow portion, at the end portion of the inner metal mold 108, and a projection 110 is provided for drawing out the inner metal mold 108 by gripping it at the end face portion of said preventing wall 109 for leakage of resin. In this manner, it is possible to draw out the inner metal mold 108 by gripping the projection 110 together with the product. The metal mold 107 shown in FIG. 20 is formed as a single body.

When a product is to be produced by an extrusion molding using the above-mentioned metal mold, the pressure exerted on the metal mold is of an order of about 20 to 50 kg/cm², so that it is not necessary to increase the thickness of the hollow metal mold, and as to the material for the hollow metal mold, an SS steel having a thickness of 3 mm or so is sufficient, thus the cost of manufacturing the metal mold is extremely low.

The above-described metal mold is adapted to accommodate an inner metal mold in a hollow metal mold, and the formed article is drawn out of the hollow metal mold having a circular or any other cross section together with the inner metal mold, so that it does not require a large-sized mold clamping device, thus the apparatus has an advantage that the cost of the installation of the forming device is substantially reduced.

Furthermore, although the metal mold is adapted to be used for forming large-sized products, the weight of the metal mold is so small, and the transport of the metal mold is easy. It follows that by preparing many metal molds, the forming operation can be continued by using another metal mold during an interval in which one of the metal mold is to be cooled after the forming, thus the number of production per hour is remarkably increased.

Next, a process adapted for producing an elongated article will be described.

It is extremely advantageous and economical, for a reutilization of resources, to produce elongated articles such as piles, sleepers, concrete panels, etc. utilizing various waste material such as sand, gravel, glass, metal, thermoplastic synthetic resin such as polyethylene, polypropylene, polyvinyl chloride, etc. produced from markets or factories.

The method to be described here relates to that of producing elongated articles such as sleepers utilizing synthetic resin waste, which is characterized by the steps of mixing a desired quantity of waste material such as sand, gravel, metal pieces, glass pieces including at least 20 weight % of thermoplastic synthetic resin with a desired quantity of foaming agent, causing to melt the thermoplastic resin in this mixture utilizing the frictional heat produced at the crushing, or by heating, extruding and pouring the melt from the apparatus into the cavity of the metal mold for an elongated article, and filling the cavity of the metal mold while overriding successively the waste containing resin which has been poured previously directing remote, or while, after the skin layer has been formed on the inner wall of the metal mold, pushing up successively the resin in the central portion surrounded by the skin layer so that no gap is produced, whereby an elongated article which has a smooth surface and having no sink mark is obtained.

An explanation will now be given concerning such a method of production referring to FIGS. 21 through 23.

In the drawing, the numeral 49 designates an outlet of the apparatus for treating synthetic resin waste. The numeral 111 in FIGS. 22 and 23 shows the metal mold, and it is constituted as will be described in the following, referring to these drawings. The same numerals shown in FIGS. 22 and 23 refer to the same parts.

Figure 22:
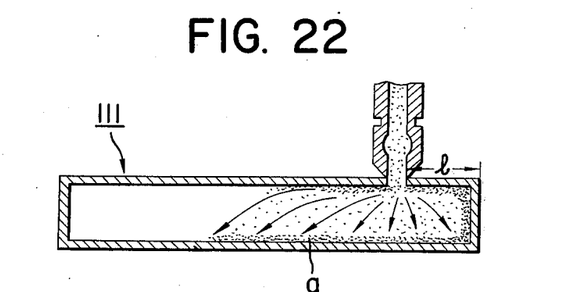
FIG. 22 is a diagrammatical view showing an example of behavior of movement of melt in the metal mold shown in FIG. 21.

At this time, the metal mold 111 is placed horizontally, not placing its longitudinal direction in the direction of gravity, as shown in FIG. 22 so that the melted waste material can be poured from the inlet 91 towards the portion remote from the inlet 91. It is also possible to place the metal mold 111 with more or less an angle.

When the metal mold is placed with its longitudinal direction directed in that of gravity or placed with a large angle to the horizontal, if the sectional area of the nozzle of the outlet of the apparatus is relatively smaller than that of the sectional area of the metal mold, the extruded waste material containing theremoplastic resin winds its way through the metal mold, whereby the product obtained has conspicuous weld lines, lacking in its strength, and develops considerable interstices therein. Also, when the diameter of the nozzle is designed just to meet with the sectional form of the metal mold, the extruded synthetic resin waste containing thermoplastic resin produces a "draw down", whereby the product obtained inevitably has pits at the surface and has sink marks.

However, in order to avoid such a defect the synthetic resin waste containing thermoplastic resin filling the metal mold from the inlet 91 is caused to override the material already poured, or as shown in FIG. 22, pushing or driving the synthetic resin poured at the central portion surrounded by a skin layer $a$ formed along the inner wall of the metal mold and filling the cavity of the metal mold successively so that no pits are produced.

In order to maintain the adequate pressure of the pushing force, the number of revolution of the rotating shaft 4 is adjusted, and it is also preferable to select a larger diameter of the nozzle of the extruder such as 25 to 50 mm as compared with a nozzle diameter (5 to 8 mm) of the conventional extruder in view of preventing a blocking of the waste material containing gravel, glass pieces, metal pieces, or the like.

It is necessary to contain at least 20 wt % of thermoplastic resin for compacting metal, glass, sand, gravel, etc. and at the same time, it is preferable to incorporate a desirable amount, for example, 0.1 to 1.5 wt %, of foaming agent, whereby the gap which may be produced in the mold or sink marks in the product can be reduced.

The thermoplastic resins comprised in the synthetic resin waste are one or mixture of two or more of the low density polyethylene, ethylene-propylene copolymer, ethylenevinyl acetate copolymer, polypropylene, polyvinyl chloride, polyvinylidene chloride, polyester and polyamide.

The foaming agents are azodicarboxy amide, dinitroso pentamechylentetraamine, azobisisobutylonitrile, 4-4 ocybenzene sulfonylhydrazide, 4-4' oxybenzene sulfonylhydrazide and etc. These are selected by the kind of the thermoplastic resin.

It is to be noted that the above-described molding can no doubt be effected when the synthetic resin waste material is 100% thermoplastic resin, except the foaming agent, not containing waste such as metal, glass, etc.

Further, the treating process is provided with a deairing and back-pressure increasing mechanism, and accordingly even though the ordinary thermoplastic resin waste usually contains 40% or less of water content and volatile matters, it is possible to produce the formed article from the thermoplastic resin waste.

Since the outer shell of the metal mold is relatively thin, the temperature thereof rises immediately by the heat of the resin filled. Therefore in spite of the lengthened outer shell of the metal mold, heating of the outer shell of the metal mold is not required. Moreover, since the metal mold is used under a low pressure, the strength required for the metal mold is not so great as is required for conventional injection molding machines.

Figure 23:
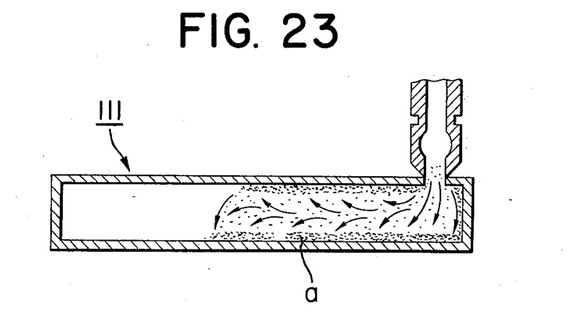
FIG. 23 is a diagrammatical view showing another example similar to FIG. 22.

In this case, as for the mounting position of the outlet 49 of the apparatus for the metal mold, that is, the mounting position of the pouring port, the distance $l$ measured from the end portion is preferably small as shown in FIGS. 22 and 23.

The mounting position of the pouring port 87 of the metal mold may be chosen so that the material poured into the metal mold is forwarded successively directing remote from the pouring portion and fill all the cavity of the metal mold.

According to the process, since no large and strong clamping device is required, it is possible to perform the molding operation continually and effectively using other metal molds while removing the operated metal mold for cooling from the apparatus. Although the cooling of the metal mold can be effected either by natural cooling or forced cooling; forced cooling after filling is more preferable than natural cooling because the skin layer can be formed more rapidly and this prevents from formation of sink marks and the surface unevenness.

Embodimental examples of the present invention will now be described.

EXAMPLE 1

Figure 21:
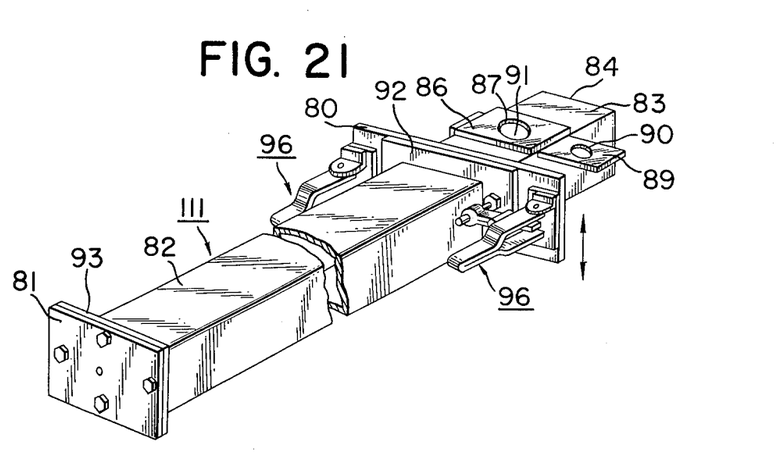
FIG. 21 is a perspective view showing another example of the metal mold shown in FIG. 12, illustrating melt extruded from the apparatus of the present invention shown in FIG. 1 is poured into the inlet of said metal mold which is placed horizontally with respect to its longitudinal direction.

Using an apparatus shown in FIG. 1 – FIG. 9 manufactured by Mitsubishi Petrochemical Co., Ltd, raw material comprising 59.5 wt % of burrs of crates made of polyethylene, 0.5 wt % of amide azodicarboxylate as a foaming agent, 25 wt % of gravel, 15 wt % of waste paper is mixed and crushed, the polyethylene in the mixture is caused to melt, and the melted material is filled into the cavity of an elongated metal mold 111, as shown in FIG. 21 having an inner dimensions of 45 mm high, 95 mm wide and a length shown below. After the filling, closing the shutter plate 89, removing the metal mold 111 from the apparatus, forcibly cooling the metal mold in a water tank. After this forced cooling, the clamping devices 96, 96 are released, the product is drawn out of the metal mold 83.

The filling time of the waste containing resin, and the external appearance of the product obtained are shown in the following Table 1.

Table 1

| Length of metal mold (cm) | 200 | 400 | 600 | 600 |
|---|---|---|---|---|
| Filling time (min) | 4 | 9 | 20 | 18 |
| Appearance of product | no sink mark, good | no sink mark, good | uneven with sink marks | with slight sink marks |

EXAMPLE 2

Raw material comprising (1) a mixture consisting of bakelite, waste paper and gravel, (2) polyethylene at a proportion shown below to above-mentioned mixture, and (3) azocarbonamide at a proportion of 0.5 wt % to the polyethylene, are mixed and crushed by means of the apparatus in Example 1, causing to melt the polyethylene, filling the melted mixture into a cavity of a metal mold 82 for pile of about 150 cm long at a pressure of about 20 kg/cm², and the metal mold is removed and cooled forcibly. The result is shown in the following Table 2.

Table 2

| Quantity of polyethylene (wt %) | 100 | 50 | 20 | 15 |
|---|---|---|---|---|

Table 2-continued

| Appearance of product | good | good | good | severe unevenness, no shock resistance |

EXAMPLE 3

To a mixture comprising 70 wt % of polyethylene film broken to pieces and 30 wt % of newspaper broken to pieces are added amide azodicarboxylate, which is a foaming agent, in a proportion mentioned below, and the mixture is filled into a cavity of a metal mold 111, 115 mm high, 115 mm wide and 2025 mm long at a temperature of 220° C from the apparatus, and compared the appearance of the products between those air-cooled (natural cooling) and water-cooled (forced cooling). The result is shown in Table 3 below.

Table 3

| Foaming agent incorporated (wt part) | 0.05 | 0.1 | 0.8 | 1.5 | 2.0 |
|---|---|---|---|---|---|
| Air-cooled Appearance: | severe surface unevenness | excel-lent | good with slight sink marks | good with some sink marks | severe sink marks |
| Water-cooled | do. | excel-lent | excel-lent | excel-lent | somewhat large sink marks |

As can be seen from Table 3, when the quantity of the foaming agent is too small, it is impossible to effect foaming sufficiently to fill the gap. On the contrary, when the quantity of the foaming agent is too large, a product having many sink marks is obtained, so that is necessary to add an appropriate quantity of the foaming agent according to the quantity of thermoplastic resin contained in the mixture.

By using the apparatus of the present invention, it is possible to obtain an elongated article such as piles, panels, sleepers, etc. which have been unable to be obtained easily by conventional injecting molding machine or extruders with the various kinds of waste material such as glass, metal, sand, gravel, paper containing at least 20 wt % of thermoplastic synthetic resin. Moreover, at filling the cavity of the metal mold, since the melted material are successively filled into the whole space of metal mold while overriding the waste containing resin filled previously from the pouring portion towards more remote portion therefrom, or while, when the resin has been filed in the metal mold to some degree, driving the previously filled mixture positioned in the skin layer a as shown in FIG. 23, and since a foaming agent is incorporated in the mixture, it is possible to obtain quite easily an elongated article which has neither surface unevenness or sink marks and which is very strong.

We claim:

1. Apparatus for treating synthetic resin waste comprising a first cylinder, a rotary driven first screw in said first cylinder having a rotary body thereon for grinding resin waste and extruding it in a plastic state, means defining a raw material feed zone on said first cylinder, means defining a discharging portion for the resin waste in a plastic state, a deairing and back-pressure increasing device having a transfer port in communication with said discharging portion and comprising a second screw rotatably driven about an axis thereof transversely to the axis of said first screw, a second cylinder containing said second screw in communication with said transfer port and having an outlet through which treated resin waste is delivered by said second screw, said second screw having a flange portion disposed circumferentially of said second screw, said transfer port being disposed between said outlet and said flange portion, and said flange portion being of lesser diameter than said second cylinder defining therewith a deairing gap for passing volatized matter without escape of the resin in a plastic state therethrough.

2. Apparatus for treating synthetic resin waste comprising, a first cylinder, a rotary driven first screw in said first cylinder having a rotary body thereon for grinding resin waste and extruding it in a plastic state, means defining a raw material feed zone on said first cylinder, means defining a discharging portion for the resin waste in a plastic state, a deairing and back-pressure increasing device having a transfer port in communication with said discharging portion and comprising a second screw rotatably driven about an axis thereof transversely to the axis of said first screw, a second cylinder containing said second screw in communication with said transfer port and having an outlet through which resin waste is delivered by said second screw, said second screw having a flange portion disposed circumferentially of said second screw, said transfer port being disposed between said outlet and said flange portion, said flange portion being of lesser diameter than said second cylinder defining therewith a deairing gap for passing volatized matter without escape of the resin in a plastic state therethrough, means to drive said first screw rotationally, means to drive said second screw rotationally, and means to reciprocate said second screw axially while being driven rotationally.

3. Apparatus for treating synthetic resin waste comprising a first cylinder, a rotary driven first screw in said first cylinder having a rotary body thereon for grinding resin waste and extruding it in a plastic state, means defining a raw material feed zone on said first cylinder, means defining a discharging portion for the resin waste in a plastic state, a deairing and back-pressure increasing device having a transfer port in communication with said discharging portion and comprising a second screw rotatably driven about an axis thereof transversely to the axis of said first screw, a second cylinder containing said second screw in communication with said transfer port and having an outlet through which treated resin waste is delivered by said second screw, said second screw having a flange portion disposed circumferentially of said second screw, said transfer port being disposed between said outlet and said flange portion, said flange portion being of lesser diameter than said second cylinder defining therewith a deairing gap for passing volatized matter without escape of the resin in a plastic state therethrough, means for driving said first screw rotationally, means for driving said second screw independently of said first screw, said rotary body of said first screw having an abacus bead-shaped longitudinal cross section, said first cylinder defining jointly with said rotary body a cylindrical annular gap about the outermost periphery of the rotary body and two annular gaps circumferentially of the rotary body communicating with said cylindrical annular gap, a first one of said two annular gaps being disposed upstream of the cylindrical annular gap and diverging toward said cylindrical annular gap, and a second one of two annular gaps being disposed downstream of said cylindrical annular gap and converging therefrom.

* * * * *